(12) United States Patent
Wang et al.

(10) Patent No.: US 10,831,238 B2
(45) Date of Patent: Nov. 10, 2020

(54) DISPLAY METHOD FOR FLEXIBLE DISPLAY SCREEN AND FLEXIBLE DISPLAY DEVICE

(71) Applicant: BOE TECHNOLOGY GROUP CO., LTD., Beijing (CN)

(72) Inventors: Zifeng Wang, Beijing (CN); Lei Cao, Beijing (CN); Yan Ren, Beijing (CN); Hailan Jin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/280,330

(22) Filed: Feb. 20, 2019

(65) Prior Publication Data
US 2019/0179371 A1 Jun. 13, 2019

Related U.S. Application Data

(63) Continuation-in-part of application No. PCT/CN2018/078125, filed on Mar. 6, 2018.

(30) Foreign Application Priority Data

Jul. 13, 2017 (CN) .......................... 2017 1 0570896

(51) Int. Cl.
*G06F 1/16* (2006.01)
*G09F 9/30* (2006.01)

(52) U.S. Cl.
CPC ............ *G06F 1/1652* (2013.01); *G09F 9/301* (2013.01); *G09G 2320/0626* (2013.01)

(58) Field of Classification Search
CPC .... G06F 1/1637; G06F 1/1652; G06F 1/1677; G06F 3/0304; G06F 3/0308;
(Continued)

(56) References Cited

U.S. PATENT DOCUMENTS 9,244,210 B2   1/2016 Sakamoto et al.
9,430,184 B2   8/2016 Cho et al.
(Continued)

FOREIGN PATENT DOCUMENTS

CN   103293589 A   9/2013
CN   103915041 A   7/2014
(Continued)

OTHER PUBLICATIONS

English abstract of CN 106340246 (Year: 2017).*
(Continued)

*Primary Examiner* — Nathan Danielsen
(74) *Attorney, Agent, or Firm* — Nath, Goldberg & Meyer; Joshua B. Goldberg; Stephanie F. Majkut

(57) ABSTRACT

The present application provides a display method for a flexible display screen and a flexible display device, and belongs to the field of flexible display technology. The flexible display device includes: a flexible display screen; and a processor, configured to determine a deformation region of the flexible display screen and adjust display brightness of at least a portion of the deformation region to a first brightness, wherein the deformation region includes a transition region and an invalid region, the first brightness is less than a second brightness which is the display brightness of an non-deformation region.

12 Claims, 2 Drawing Sheets

(58) Field of Classification Search
CPC .......... G06F 3/0317; G06F 3/0325; G06F 3/042–0428; G09F 9/301; G09G 3/32–3291; G09G 3/36–3696; G09G 2310/04; G09G 2330/02–022; G09G 2340/14; G09G 2340/145; G09G 2360/08; G09G 2360/16; G09G 2380/02
See application file for complete search history.

(56) References Cited

U.S. PATENT DOCUMENTS

| | | | |
|---|---|---|---|
| 10,188,002 B2 | 1/2019 | Yang et al. | |
| 10,379,578 B2 | 8/2019 | An | |
| 2011/0181553 A1* | 7/2011 | Brown | G06F 3/0425 345/175 |
| 2013/0154970 A1* | 6/2013 | Seo | G06F 1/1643 345/173 |
| 2015/0301672 A1 | 10/2015 | Kim et al. | |
| 2016/0205391 A1 | 7/2016 | Kim | |
| 2017/0169759 A1* | 6/2017 | Jang | G06F 1/1652 |
| 2017/0177403 A1* | 6/2017 | Choi | G06F 1/1616 |
| 2018/0204539 A1* | 7/2018 | Yang | G09G 5/10 |
| 2019/0179371 A1 | 6/2019 | Wang et al. | |

FOREIGN PATENT DOCUMENTS

| | | |
|---|---|---|
| CN | 105047085 A | 11/2015 |
| CN | 103915041 B | 3/2016 |
| CN | 105408854 A | 3/2016 |
| CN | 105452983 A | 3/2016 |
| CN | 105556951 A | 5/2016 |
| CN | 105723442 A | 6/2016 |
| CN | 106340246 A | 1/2017 |
| CN | 106409148 A | 2/2017 |
| CN | 107103875 A | 8/2017 |
| CN | 107146529 A | 9/2017 |
| JP | 5842602 B2 | 1/2016 |
| KR | 20120116813 A | 10/2012 |
| KR | 101872031 B1 | 6/2018 |
| WO | 2016041096 A1 | 3/2016 |
| WO | 2018201755 A1 | 11/2018 |

OTHER PUBLICATIONS

First Office Action of CN; Application No. 201710570896.0; dated Jan. 28, 2019; English Translation Attached.
International Search Report dated Jun. 12, 2018 corresponding to application No. PCT/CN2018/078125.

* cited by examiner

DISPLAY METHOD FOR FLEXIBLE DISPLAY SCREEN AND FLEXIBLE DISPLAY DEVICE

CROSS-REFERENCE TO RELATED APPLICATIONS

The present application claims the priority of Chinese Patent Application No. 201710570896.0, filed on Jul. 13, 2017, the content of which is incorporated herein by reference in their entirety.

TECHNICAL FIELD

The present disclosure relates to the field of flexible display, and particularly to a display method for flexible display screen and a flexible display device.

BACKGROUND

Flexible display has the ability of being bendable and foldable, and it can still display images normally without being damaged after being bent. The flexible display also has the characteristics of being light, thin, and durable. Thus, the flexible display is widely popular in the field of display technology and has broad application prospect.

SUMMARY

The present application provides a flexible display device, including: a flexible display screen; and a processor, configured to determine a deformation region of the flexible display screen and adjust display brightness of at least a portion of the deformation region to a first brightness, wherein the deformation region includes a transition region and an invalid region, the first brightness is less than a second brightness which is the display brightness of an non-deformation region.

In an embodiment, the processor is further configured to determine the transition region and the invalid region according to the deformation region, and adjust the display brightness of the invalid region in the deformation region to the first brightness, and the processor is further configured to adjust the display brightness of the transition region to a third brightness, the third brightness is greater than the first brightness and less than the second brightness.

In an embodiment, the processor is further configured to determine a set of points constituting the deformation region and position information of multiple feature points in the deformation region according to a spatial position relationship of multiple feature points in a display surface of the flexible display screen.

In an embodiment, the processor is further configured to determine the transition region and the invalid region according to the position information of the multiple feature points in the deformation region and the position information of a viewing point R.

In an embodiment, the flexible display device further includes a first sensor configured to detect distances and angles from the multiple feature points in the display surface of the flexible display screen to the first sensor, and the processor is further configured to determine the set of points of the deformation region and the position information of the multiple feature points in the deformation region according to the distances and the angles.

In an embodiment, the flexible display device further includes a first sensor configured to capture an image of a user's eyes viewing at the viewing point R, and the processor is further configured to determine the position information of the viewing point R according to the image.

In an embodiment, the processor is further configured to, for each feature point Q in the deformation region: determine a line segment $L_{QR}$ connecting the viewing point R and the feature point Q according to the position information of the viewing point R; determine a position relationship between the line segment $L_{QR}$ and a tangent plane $M_Q$ of the flexible display screen at the feature point Q; and determine whether the feature point Q belongs to the invalid region or the transition region according to the position relationship.

In an embodiment, the processor is configured to determine whether the feature point Q belongs to the invalid region or the transition region according to the position relationship by: determining that the feature point Q belongs to the invalid region if the line segment $L_{QR}$ is on the tangent plane $M_Q$, or is on a side of the tangent plane $M_Q$ proximal to the display surface of the flexible display screen; and determining that the feature point Q belongs to the transition region if the line segment $L_{QR}$ is on a side of the tangent plane $M_Q$ distal to the display surface of the flexible display screen.

In an embodiment, the flexible display device further includes a display brightness control circuit connected to the processor, wherein the processor is further configured to control the display brightness control circuit to adjust the display brightness of the deformation region by sending an instruction.

The present application further provides a display method for a flexible display screen, including: determining a deformation region of the flexible display screen; and adjusting display brightness of at least a portion of the deformation region to a first brightness, wherein the deformation region includes a transition region and an invalid region, the first brightness is less than a second brightness which is the display brightness of an non-deformation region.

In an embodiment, the display method further includes: determining the transition region and the invalid region according to the deformation region.

In an embodiment, the adjusting display brightness of at least a portion of the deformation region to the first brightness includes: adjusting the display brightness of the invalid region in the deformation region to the first brightness.

In an embodiment, the display method further includes: adjusting the display brightness of the transition region to a third brightness, the third brightness is greater than the first brightness and less than the second brightness.

In an embodiment, the first brightness is zero.

In an embodiment, the determining the deformation region includes: determining a set of points constituting the deformation region and position information of multiple feature points in the deformation region according to a spatial position relationship of multiple feature points in a display surface of the flexible display screen.

In an embodiment, the determining the transition region and the invalid region includes: determining the transition region and the invalid region according to the position information of the multiple feature points in the deformation region and the position information of a viewing point R.

In an embodiment, the determining the deformation region includes: detecting, by a first sensor, distances and angles from the multiple feature points in the display surface of the flexible display screen to the first sensor; and determining the set of points of the deformation region and the position information of the multiple feature points in the deformation region according to the distances and the angles.

In an embodiment, the determining the transition region and the invalid region includes: capturing, by a second sensor, an image of a user's eyes viewing at the viewing point R; and determining the position information of the viewing point R according to the image.

In an embodiment, the determining the transition region and the invalid region includes: for multiple feature points Q in the deformation region, determining a line segment $L_{QR}$ connecting the viewing point R and the feature point Q according to the position information of the viewing point R; determining a position relationship between the line segment $L_{QR}$ and a tangent plane $M_Q$ of the flexible display screen at the feature point Q; and determining whether the feature point Q belongs to the invalid region or the transition region according to the position relationship.

In an embodiment, the determining whether the feature point Q belongs to the invalid region or the transition region according to the position relationship includes: determining that the feature point Q belongs to the invalid region if the line segment $L_{QR}$ is on the tangent plane $M_Q$, or is on a side of the tangent plane $M_Q$ proximal to the display surface of the flexible display screen; and determining that the feature point Q belongs to the transition region if the line segment $L_{QR}$ is on a side of the tangent plane $M_Q$ distal to the display surface of the flexible display screen.

DETAILED DESCRIPTION

For better understanding of the technical solutions of the present application by those skilled in the art, the present application will be further described in detail below with reference to the accompanying drawings and specific embodiments.

The display of a flexible display is generally a self-illuminating display, and its real-time power consumption is directly related to the brightness of the displayed picture. During the display, when the flexible display screen is deformed, a phenomenon, that a partial region of the flexible display screen cannot be seen from a viewing point due to the deformation, may occur, wherein the region is referred to as an invalid display region.

However, at present, the flexible display is displaying as a whole when displaying (all regions display), and a valid display region and an invalid display region are not distinguished. Since the user cannot see the invalid display region, displaying on the invalid display region may result in waste of energy.

To this end, the present application provides a display method for a flexible display screen, which can reduce the display power consumption of the flexible display screen without affecting the viewing effect, so as to at least solve the problem of waste of energy due to displaying on a region of the flexible display screen that cannot be seen by the user in related art.

Figure 1:
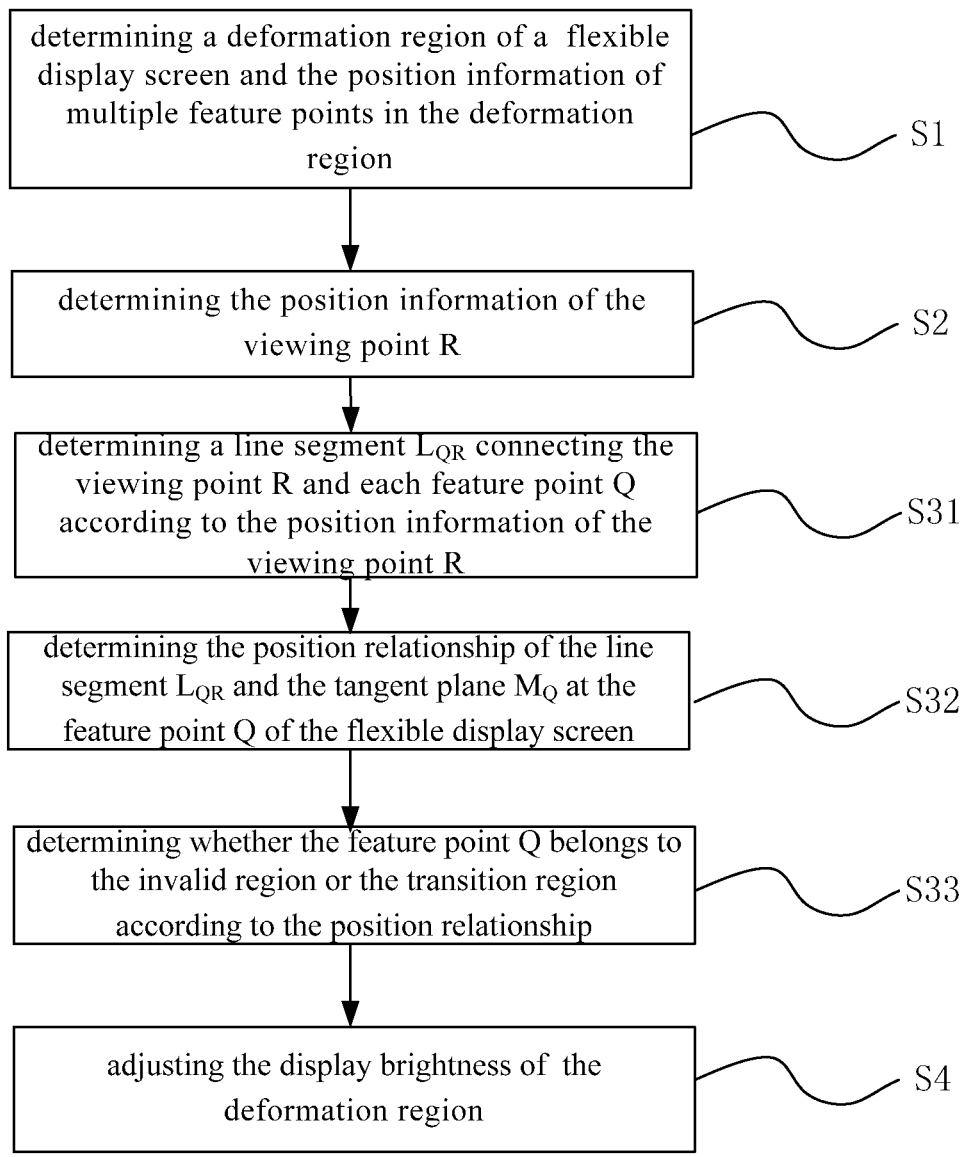
FIG. 1 is a flow chart of a display method for a flexible display screen according to an embodiment of the present application.
Figure 2:
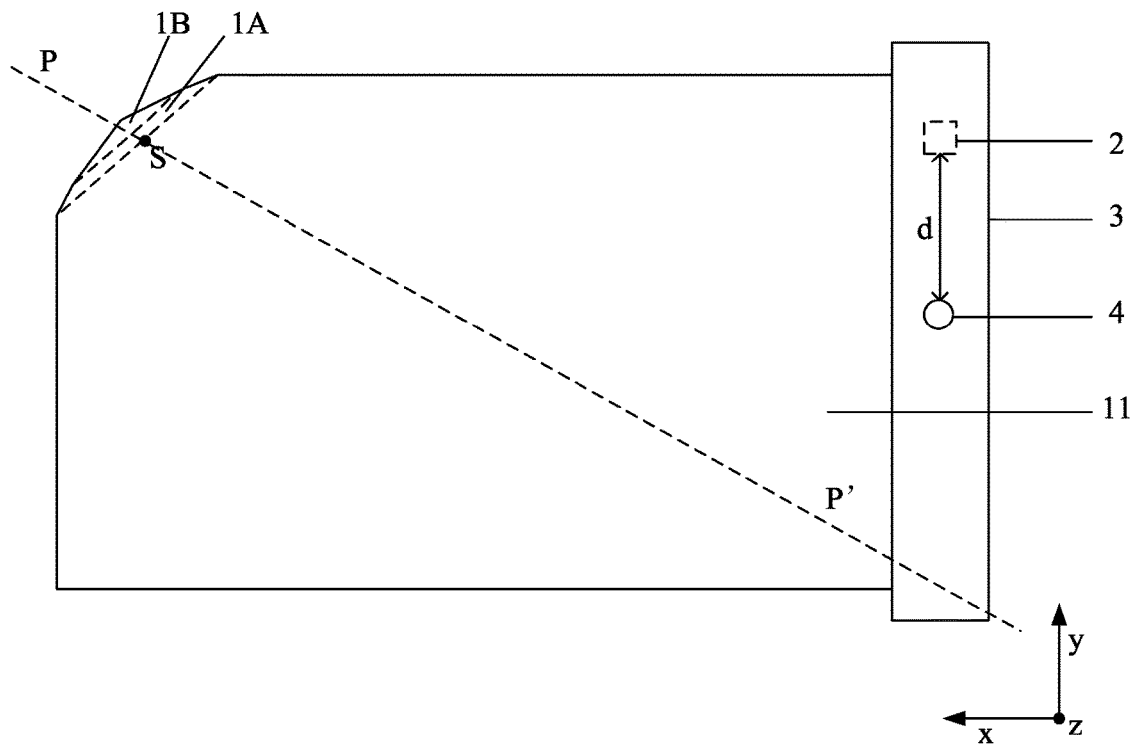
FIG. 2 is a top view of a flexible display device according to an embodiment of the present application.
Figure 3:
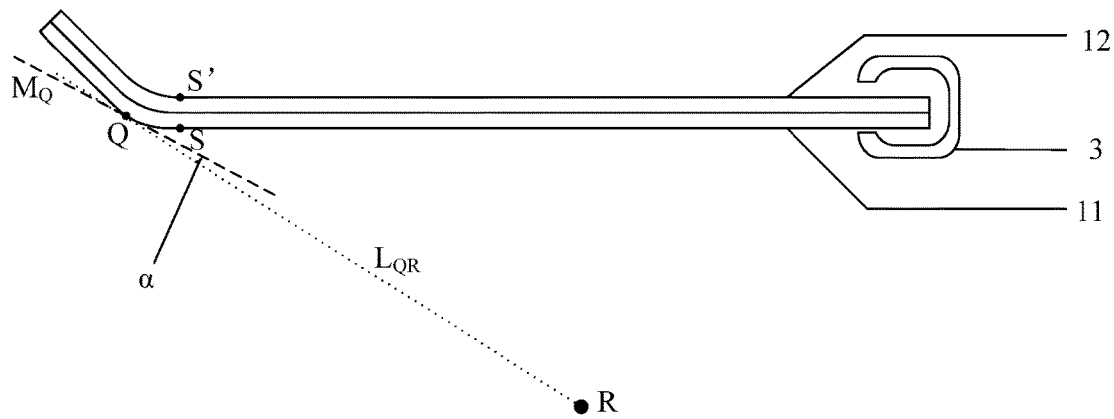
FIG. 3 is a cross-sectional view of the flexible display device of FIG. 2 taken along line PP' according to the present application.

As shown in FIG. 1 to FIG. 3, an embodiment of the present application provides a display method for a flexible display screen.

In an embodiment, the flexible display screen may be a self-illuminating flexible display screen, such as an organic light emitting diode (OLED) display screen.

As shown in FIG. 1, the display method includes the following steps S1-S4.

At step S1, when a partial region of the flexible display screen is deformed, a deformation region of the flexible display screen (a set of points constituting the deformation region) and position information of multiple feature points in the deformation region are determined.

In an embodiment, the above deformation refers to a deformation with respect to a standard state. Generally, the flexible display screen has a plane of standard state, and a partial region of the flexible display screen can be deformed to make the flexible display in a non-plane state. In this case, a region still in the plane of standard state is called a normal display region, and a region no longer in the plane of standard state is the region where the deformation occurs, that is, the deformation region (the deformation region may be partially plane, but it is no longer in the plane of standard state).

In an embodiment, a side of the flexible display for displaying to a user is referred to as a display surface. With respect to a region still in the plane of standard state, the deformation region may be deformed toward a side distal to the display surface (i.e., becoming distal to the user), or may be deformed toward a side proximal to the display surface (i.e., becoming proximal to the user). The deformation region in an embodiment illustratively directs to a region deformed toward the side distal to the display surface. For example, in FIG. 2, the upper left corner of the flexible display screen, a region labeled as 1A and 1B, is bent backwards (i.e., distal to the user). The 1A region together with the 1B region forms the deformation region.

In an embodiment, the deformation region (a set of position of each point in the deformation region) and the position information of multiple feature points in the deformation region can be determined by determining the spatial position of multiple feature points in the display surface of the flexible display screen. The plurality of feature points in the display surface of the flexible display screen may be, for example, N equal points of each side of the flexible display screen (points dividing each side into N equal portions), points of intersection of lines connecting corresponding N equal points of opposite sides of the flexible display screen, and may also be grid points of a grid in a case where the display surface can be divided into a plurality of portions by the grid. It should be understood that the feature points may also be determined in other suitable manners. In an embodiment, the position information of feature points may be represented in the form of coordinate. When the position information of the multiple feature points is known, position information of other points (e.g., non-feature points) may be calculated by using location information of the multiple feature points.

In an embodiment of the present application, a distance and an angle of multiple feature points in the display surface of the flexible display screen to a sensor 2 are measured by the sensor 2.

As shown in FIG. 2, the sensor 2 is disposed in a non-display region of the flexible display. Through sensing by scanning, the sensor 2 can determine the distance and the orientation (angle) of multiple feature points in the display surface of the flexible display screen to the sensor 2. The set of points of the deformation region and the position information of multiple feature points in the deformation region may be determined according to the above distance and orientation and the position of the sensor 2 itself.

The following implementations are described in a case where the sensor 2 is an infrared sensor. Specifically, the sensor 2 can emit infrared light in different directions. The sensor 2 determines the distance between an obstacle and the sensor 2 according to a period of time from a time point when a ray of infrared light is emitted by the sensor 2 to a time point when the ray of infrared light is reflected back upon encounter of the obstacle, and determines the direction of the obstacle according to the angle (orientation) of the ray of infrared light, and determines the spatial position of the obstacle relative to the sensor 2 by combination of the distance and the direction. Thus, the sensor 2 can determine the relative position of multiple feature points in the display region of the display screen, and analyze the position relationship of the feature points to determine which feature points are still in the plane of the standard state, and which feature points are in the deformation region where deformation occurs. Thereby, the boundary between the deformation region and a normal display region can also be determined (as indicated by the dotted line between the 1A region and the lower right region thereof in FIG. 2).

It should be understood that, the sensor 2 can be any suitable sensor, it should also be understood that, if the sensor 2 is disposed on the back of the flexible display, it actually detects the position of the feature point on the back of the flexible display (e.g., feature point S'). However, since the flexible display has a certain thickness, the position of a feature point (such as point S) on the display surface can also be determined by the position of a corresponding feature point on the back of the flexible display (for example, there is a difference, corresponding to the determined thickness of the flexible display screen, between the position of the feature point S' and the position of the feature point S).

Of course, other methods may be used to determine the deformation region of the flexible display screen and the position information of multiple feature points in the deformation region, such as laser scanning, image capturing and analyzing, etc., and the specific implementation thereof will not be described herein.

At step S2, the position information of the user's viewing point R is determined.

In an embodiment, the viewing point R refers to a point from which the user views the flexible display screen, which may be the position of the midpoint of the user's eyes.

In an embodiment, the position information of the user's viewing point R is determined by a sensor 4. The following implementations are described in a case where the sensor 4 is a camera. Specifically, an image including the user's eyes may be acquired by the sensor 4, and the position information of the viewing point R relative to the sensor 4 is determined according to the image, to further determine the position information of the viewing point R relative to the flexible display screen. In an embodiment, the position information of the viewing point R may also be represented in the form of coordinate.

Of course, the sensor 4 may also be any other suitable sensor, and in addition to the sensor 4, the position information of the viewing point R can be obtained by other means. For example, an infrared light source can be set, and the position of human eyes can be determined by detecting infrared rays reflected by the human eyes. Other manners will not be described herein.

It can be understood that, when executing S1 and S2, S1 may be executed first and then S2 may be executed, or S2 may be executed first and then S1 may be executed, or both of S1 and S2 may be performed concurrently, and there is no specific limitation herein. In addition, in an embodiment, the sensor 2 and the sensor 4 may be disposed at a same position, or may be disposed at different positions, and the specific disposing manner may be determined according to actual conditions, and there is no specific limitation herein.

At step S3, the transition region 1A and the invalid region 1B of the flexible display screen (see FIG. 2) are determined according to the position information of multiple feature points in the deformation region and the position information of the viewing point R, wherein the invalid region 1B is an region in the deformation region that cannot be seen from a viewing point R due to the deformation, and the transition region is an region in the deformation region except for the invalid region (that is, a region that the user can see and is in the deformation region).

It can be understood that, when a partial region of the flexible display screen is deformed toward a side distal to the display surface with respect to the standard state, a region which cannot be seen or in which the viewing effect thereof changes may appear on the flexible display screen. In this case, as shown in FIG. 3, since the user's line of sight is in a straight line, a part of positions in deformation region may be blocked by other parts of the flexible display screen, causing that the user cannot see these positions from the viewing point. These positions are the invalid region 1B (as shown in FIG. 2). Similarly, although the position other than the invalid region in the deformation region can be seen by the user, the viewing effect of the user viewing these positions may change due to an angle issue (for example, the image may be distorted). These positions are the transition region 1A (FIG. 2). Therefore, when the flexible display screen is deformed, it may actually be divided into three parts: the normal display region, the transition region 1A, and the invalid region 1B, wherein the transition region 1A together with the invalid region 1B are the deformation region.

It can be understood that, when the flexible display screen is deformed with respect to the standard state, there may be a case where merely the transition region 1A exists and no invalid region 1B exists, depending on the degree of deformation thereof.

It should be noted that, in an embodiment, when the flexible display screen is completely in the standard state (i.e., the plane of the standard state), the user can see all the regions of the flexible display screen, and the viewing effect is good. In this case, there is no deformation region (certainly, there is no transition region 1A and invalid region 1B).

In an embodiment, the transition region 1A and the invalid region 1B of the flexible display screen can be determined by determining the position relationship between the viewing point R and multiple feature points in the deformation region.

In an embodiment, the transition region 1A and the invalid region 1B of the flexible display screen may be determined by the following steps S31-S33: establishing a coordinate system with the sensor 4 as an origin; obtaining coordinates of multiple feature points and the viewing points R in the reference system according to the position relationship between the sensor 2 and the sensor 4 and position information of multiple feature points in the deformation region and viewing point R obtained in steps S1 and S2; and determining the position relationship between the viewing point R and multiple feature points in the deformation region by using the coordinates, in order to determine the transition region 1A and the invalid region 1B of the flexible display screen.

In an embodiment, the step specifically includes steps S31-S33, which will be described in detail below.

At step S31, for each feature point Q in the deformation region, the line segment $L_{QR}$ connecting the viewing point R and the feature point Q in the deformation region is determined according to the position information of the user's viewing point R.

For example, taking the sensor 4 as the origin, the lateral direction of the flexible display screen (the horizontal direction in FIG. 2) as the x-axis, and the longitudinal direction of the flexible display screen (the vertical direction in FIG. 2) as the y-axis, a direction perpendicular to the flexible display screen (the direction perpendicular to plane in FIG. 2) as the z-axis to establish a coordinate system, and assuming that the coordinates of the viewing point R are R $(x_0, y_0, z_0)$, and the coordinates of any feature point Q in the deformation region are $Q(x_1, y_1, z_1)$, the expression of the line segment $L_{QR}$ in this coordinate system can be calculated as $(x-x_1)/(x-x_0)=(y-y_1)/(y-y_0)=(Z-z_1)/(z-z_0)$.

It can be understood that, since the position information of the feature point Q is obtained by the sensor 2, as shown in FIG. 2, assuming that the sensor 2 and the sensor 4 are both located in the y-axis of the flexible display screen, and the distance therebetween along the y-axis direction is d, then the coordinates of the sensor 2 in the coordinate system established with the sensor 4 as the origin are (0, d, 0). If the coordinates of the feature point Q in the coordinate system established with the sensor 2 as the origin (the direction of each coordinate axis is parallel to the direction of each coordinate axis in the coordinate system established with the sensor 4 as the origin) are (x1', y1', z1'), then in the coordinates of feature point Q (i.e., (x1, y1, z1)) in the coordinate system established with the sensor 4 as the origin, x1=x1', y1=y1'+d, and z1=z1'.

At step S32, the position relationship of the line segment $L_{QR}$ and the tangent plane $M_Q$ at the feature point Q of the flexible display screen is determined.

The position relationship of the line segment $L_{QR}$ and the tangent plane $M_Q$ of the flexible display screen at the feature point Q is determined by the expression of the line segment $L_{QR}$ in the above coordinate system. Specifically, the position relationship between the line segment $L_{QR}$ and the tangent plane $M_Q$ of the flexible display screen at the feature point Q is determined by calculating the angle α (being positive, negative or zero) between the line segment $L_{QR}$ and the tangent plane $M_Q$, wherein whether the angle α is positive or negative is determined according to the region (direction) where the segment $L_{QR}$ (which is the terminal side of the angle α) is located, so that the angle α being positive or negative indicates the region where the segment $L_{QR}$ is located. As can be seen from FIG. 3, the tangent plane $M_Q$ at the feature point Q has two sides, wherein the side on which the display screen is located is referred to as the side of the display surface of the tangent plane $M_Q$ proximal to the flexible display screen, and the other side is referred to as the side of the tangent plane $M_Q$ distal to the flexible display screen. Taking the side of the tangent plane $M_Q$ distal to the flexible display screen as positive, when a is positive, it is indicated that the line segment $L_{QR}$ is located on the side of the tangent plane $M_Q$ distal to the display surface of the flexible display screen; when a is negative, it is indicated that the line segment $L_{QR}$ is located on the side of the tangent plane $M_Q$ proximal to the display surface of the flexible display screen; and when α=0, it is indicated that the line segment $L_{QR}$ is located on the tangent plane $M_Q$ (or the line segment $L_{QR}$ is parallel to the tangent plane $M_Q$).

At step S33, whether the feature point Q belongs to the invalid region 1B or the transition region 1A is determined according to the position relationship determined at the above step S32. Specifically, if the line segment $L_{QR}$ is located on the tangent plane $M_Q$ (i.e., if α=0), or is located on the side of the tangent plane $M_Q$ proximal to the display surface of the flexible display screen (i.e., if a is a negative), then the feature point Q belongs to the invalid region 1B. If the line segment $L_{QR}$ is located on the side of the tangent plane MQ distal to the display surface of the flexible display screen (i.e., if a is a positive), then the feature point Q belongs to the transition region 1A.

Further from the user's point of view, as shown in FIG. 3, when the line segment $L_{QR}$ is located on the tangent plane $M_Q$ (i.e., the line segment $L_{QR}$ is parallel to the tangent plane $M_Q$), or when the line segment $L_{QR}$ is located on the side of the tangent plane MQ proximal to the display surface of the flexible display screen, it is indicated that the user cannot see the feature point Q, then the feature point Q belongs to the invalid region 1B. When the line segment $L_{QR}$ is located on the side of the tangent plane MQ distal to the display surface of the flexible display screen, it is indicated that the user can see the feature point Q, then the feature point Q belongs to the transition region 1A. It should be understood that, based on the above steps, the boundary line between the transition region 1A and the invalid region 1B, i.e., the dotted line between the region 1A and the region 1B as shown in FIG. 2, can be calculated according to the position information of the multiple feature points in the deformation region.

Of course, the above steps S1 to S3 are actually the step of "determining the transition region 1A and the invalid region 1B of the flexible display screen", and more specifically, are actually the step of "determining the transition region 1A and the invalid region 1B of the flexible display screen according to the position information of multiple feature points in the deformation region and the position information of the viewing point R". However, it should be understood that the transition region 1A and the invalid region 1B may also be determined by other means. For example, the transition region 1A and the invalid region 1B may be selected and divided by the user.

At step S4, a display brightness of the deformation region is adjusted.

Specifically, the display brightness can be adjusted in different manners according to the type of the flexible display screen. For example, when the flexible display screen is an organic light emitting diode (OLED) display screen, the display brightness may be adjusted by adjusting the brightness of the organic light emitting diode in corresponding pixel units; and when the flexible display screen is a liquid crystal flexible display screen, the display brightness can be adjusted by adjusting the backlight brightness of a corresponding region or changing the degree of liquid crystal deflection of the corresponding region.

In an embodiment, the display brightness of at least a portion of the deformation region to a first brightness may be adjusted, wherein the first brightness is less than a second brightness which is the display brightness of an non-deformation region.

In an embodiment, the display brightness of the invalid region in the deformation region may be adjusted to the first brightness.

In an embodiment, the display brightness of the transition region may be adjusted to a third brightness, the third brightness is greater than the first brightness and less than the second brightness. Although the user can see the transition region 1A, the display content of the transition region 1A is not the main viewing region of the user, and even if the display brightness thereof is reduced, the influence on the viewing effect may be not significant. Thus, the display brightness of the transition region 1A can be reduced.

In an embodiment, the first brightness may be zero. Obviously, since the invalid region 1B cannot be seen, reducing the display brightness thereof to zero (or, a state in which the gray level of the display brightness is 0) can minimize the power consumption.

In an embodiment, the display brightness of the transition region 1A may be gradually reduced in a direction approaching the invalid region 1B.

Specifically, the degree of decrease in brightness may be linearly increased in the direction approaching the invalid region 1B, or may be adjusted, in the direction approaching the invalid region 1B, according to the angles α for multiple feature points Q. The details may be adjusted according to actual conditions, and there is no limitation herein. Thereby, a gradual visual effect may avoid causing visual conflicts to the user.

In conclusion, embodiments of the present application provide a display method for a flexible display screen. When a partial region of the flexible display screen is deformed, the deformation region and the transition region 1A and the invalid region 1B in the deformation region can be determined, and the display brightness of the transition region 1A and/or the invalid region 1B can be adjusted, thereby reducing the display power consumption of the flexible display screen without affecting the viewing effect.

Figure 4:
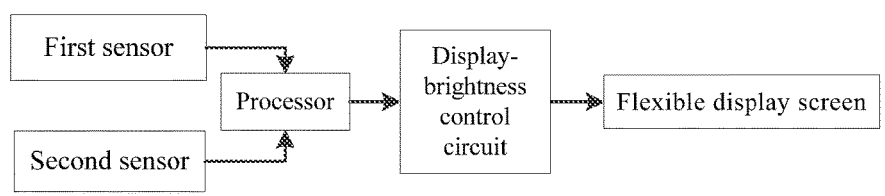
FIG. 4 is a block diagram of the composition of a flexible display device according to an embodiment of the present application.

As shown in FIGS. 2 to 4, embodiments of the present application further provide a flexible display device for controlling the display brightness of the flexible display screen according to the display method provided by embodiments of the present application.

As shown in FIG. 4, the flexible display device may include: a flexible display screen, a first sensor, a second sensor, a processor and a display-brightness control circuit.

In an embodiment of this application, the flexible display screen may be a self-illuminating flexible display screen, such as an organic light emitting diode (OLED) display screen. As shown in FIGS. 2 and 3, the flexible display screen includes a display base layer 11 and an encapsulation layer 12.

The processor may be configured to determine the deformation region of the flexible display screen. The processor may further be configured to determine the transition region 1A and the invalid region 1B in the deformation region, when a partial region of the flexible display screen is deformed, wherein the deformation region is an region in which an deformation occurs on the flexible display screen, and the invalid region 1B is an region in the deformation region that cannot be seen from a viewing point R due to the deformation, and the transition region 1A is an region in the deformation region except for the invalid region.

In an embodiment, the deformation region may be a region that is deformed distal to the display surface side with respect to the standard state (such as 1A and 1B in FIG. 2).

In an embodiment, the processor is further configured to determine a set of points constituting the deformation region position and position information of multiple feature points in the deformation region according to a spatial position relationship of multiple feature points in a display surface of the flexible display screen.

In an embodiment, the first sensor may be the sensor 2, such as, an infrared sensor. The sensor 2 is configured to measure a distance and an angle from multiple feature points in the display surface of the flexible display screen to the sensor 2, and the processor is further configured to determine the deformation region of the flexible display screen and the position information of multiple feature points in the deformation region according to the distance and the angle.

The sensor 2 may be disposed in a non-display region of the flexible display. It can be understood that the flexible display device further includes other structures such as the hand-held frame 3. As shown in FIG. 2, the sensor 2 can be disposed on the hand-held frame 3.

The second sensor is configured to determine the position information of the viewing point R.

In an embodiment, the second sensor may be the sensor 4, such as, a camera. The sensor 4 is configured to capture an image of a user's eyes viewing at the viewing point R, and the processor is further configured to determine the position information of the viewing point R according to the image.

The sensor 4 may be disposed in a non-display region of the flexible display screen. As shown in FIG. 2, the sensor 4 can be disposed on the hand-held frame 3 at the display edge position.

In an embodiment, the processor is configured to determine the transition region 1A and the invalid region 1B according to position information of multiple feature points in the deformation region and position information of the viewing point R.

The processor is further configured to: for multiple feature points Q in the deformation region, determine a line segment $L_{QR}$ connecting the viewing point R and the feature point Q according to the position information of the viewing point R; determine a position relationship between the line segment $L_{QR}$ and a tangent plane $M_Q$ of the flexible display screen at the feature point Q; and determine whether the feature point Q belongs to the invalid region 1B or the transition region 1A according to the position relationship.

In an embodiment, the processor is configured to determine whether the feature point Q belongs to the invalid region 1B or the transition region 1A according to the position relationship by: determining that the feature point Q belongs to the invalid region if the line segment $L_{QR}$ is on the tangent plane $M_Q$, or is on a side of the tangent plane $M_Q$ proximal to the display surface of the flexible display screen; and determining that the feature point Q belongs to the transition region if the line segment $L_{QR}$ is on a side of the tangent plane $M_Q$ distal to the display surface of the flexible display screen.

In an embodiment, the processor is further configured to adjust the display brightness of at least a portion of the deformation region to a first brightness, wherein the first brightness is less than a second brightness which is the display brightness of an non-deformation region.

In an embodiment, the processor is further configured to adjust the display brightness of the transition region to a third brightness, the third brightness is greater than the first brightness and less than the second brightness.

In an embodiment, the processor is further configured to control the display brightness control circuit to adjust the display brightness of the deformation region (such as, the transition region and the invalid region) by sending an instruction.

It should be noted that, the processor may be may be any suitable processor capable of implementing the technical solution of the present application. The processor may execute processor executable instructions stored in a memory, wherein when the executable instructions is executed, the display method as described in various embodiments of the present application can be realized.

In conclusion, embodiments of the present application provide a flexible display device for adjusting the display brightness of the flexible display screen according to the display method provided by embodiments of the present application. When a partial region of the flexible display screen is deformed, the deformation region and the transition region 1A and the invalid region 1B in the deformation region can be determined, and the display brightness of the transition region 1A and/or the invalid region 1B can be adjusted, thereby reducing the display power consumption of the flexible display screen without affecting the viewing effect.

It should be understood that, the above embodiments are merely exemplary embodiments employed to illustrate the principles of the application, and the application is not limited thereto. Various modifications and improvements can be made by those skilled in the art without departing from the spirit and scope of the present application.

What is claimed is:

1. A flexible display device, comprising:
a flexible display screen; and
a processor, configured to determine a deformation region of the flexible display screen and adjust display brightness of at least a portion of the deformation region to a first brightness,
wherein the deformation region comprises a transition region and an invalid region, the first brightness is less than a second brightness which is a display brightness of an non-deformation region,
wherein the processor is further configured to determine the transition region and the invalid region according to the deformation region, and adjust a display brightness of the invalid region in the deformation region to the first brightness,
the processor is further configured to adjust a display brightness of the transition region to a third brightness, the third brightness is greater than the first brightness and less than the second brightness, and
the processor is further configured to determine a set of points constituting the deformation region and position information of multiple feature points in the deformation region according to a spatial position relationship of multiple feature points in a display surface of the flexible display screen, and
wherein the flexible display device further comprises:
a first sensor, configured to detect distances and angles from the multiple feature points in the display surface of the flexible display screen to the first sensor, and
the processor is further configured to determine the set of points of the deformation region and the position information of the multiple feature points in the deformation region according to the distances and the angles.

2. The flexible display device of claim 1, wherein,
the processor is further configured to determine the transition region and the invalid region according to position information of multiple feature points in the deformation region and position information of a viewing point R.

3. The flexible display device of claim 2, further comprising:
a second sensor, configured to capture an image of a user's eyes viewing at the viewing point R, and
the processor is further configured to determine the position information of the viewing point R according to the image.

4. The flexible display device of claim 3, wherein the processor is further configured to: for each feature point Q in the deformation region,
determine a line segment LQR connecting the viewing point R and the feature point Q according to the position information of the viewing point R;
determine a position relationship between the line segment LQR and a tangent plane MQ of the flexible display screen at the feature point Q; and
determine whether the feature point Q belongs to the invalid region or the transition region according to the position relationship.

5. The flexible display device of claim 4, wherein the processor is configured to determine whether the feature point Q belongs to the invalid region or the transition region according to the position relationship by:
determining that the feature point Q belongs to the invalid region when the line segment LQR is on the tangent plane MQ, or is on a side of the tangent plane MQ proximal to the display surface of the flexible display screen; and
determining that the feature point Q belongs to the transition region when the line segment LQR is on a side of the tangent plane MQ distal to the display surface of the flexible display screen.

6. The flexible display device of claim 1, further comprising:
a display brightness control circuit connected to the processor,
wherein the processor is further configured to control the display brightness control circuit to adjust the display brightness of the deformation region by sending an instruction.

7. A display method for a flexible display screen, comprising:
determining a deformation region of the flexible display screen; and
adjusting display brightness of at least a portion of the deformation region to a first brightness,
wherein the deformation region comprises a transition region and an invalid region, the first brightness is less than a second brightness which is the display brightness of an non-deformation region,
the display method further comprises determining the transition region and the invalid region according to the deformation region;
wherein the adjusting display brightness of at least a portion of the deformation region to the first brightness comprises: adjusting the display brightness of the invalid region in the deformation region to the first brightness;
wherein the display method further comprises: adjusting the display brightness of the transition region to a third brightness, the third brightness is greater than the first brightness and less than the second brightness;
wherein the determining the deformation region comprises: determining a set of points constituting the deformation region and position information of multiple feature points in the deformation region according to a spatial position relationship of multiple feature points in a display surface of the flexible display screen;

wherein the determining the deformation region comprises: detecting, by a first sensor, distances and angles from the multiple feature points in the display surface of the flexible display screen to the first sensor; and determining the set of points of the deformation region and the position information of the multiple feature points in the deformation region according to the distances and the angles.

8. The display method of claim 7, wherein,
the first brightness is zero.

9. The display method of claim 7, wherein the determining the transition region and the invalid region comprises:
determining the transition region and the invalid region according to the position information of the multiple feature points in the deformation region and the position information of a viewing point R.

10. The display method of claim 9, wherein the determining the transition region and the invalid region comprises:
capturing, by a second sensor, an image of a user's eyes viewing at the viewing point R; and
determining the position information of the viewing point R according to the image.

11. The display method of claim 10, wherein the determining the transition region and the invalid region comprises: for multiple feature points Q in the deformation region,
determining a line segment LQR connecting the viewing point R and the feature point Q according to the position information of the viewing point R;
determining a position relationship between the line segment LQR and a tangent plane MQ of the flexible display screen at the feature point Q; and
determining whether the feature point Q belongs to the invalid region or the transition region according to the position relationship.

12. The display method of claim 11, wherein the determining whether the feature point Q belongs to the invalid region or the transition region according to the position relationship comprises:
determining that the feature point Q belongs to the invalid region if the line segment LQR is on the tangent plane MQ, or is on a side of the tangent plane MQ proximal to the display surface of the flexible display screen; and
determining that the feature point Q belongs to the transition region if the line segment LQR is on a side of the tangent plane MQ distal to the display surface of the flexible display screen.

* * * * *